(12) United States Patent
Takahashi et al.

(10) Patent No.: US 12,448,500 B2
(45) Date of Patent: Oct. 21, 2025

(54) POLYBUTADIENE COMPOSITION, PRODUCTION METHOD THEREFOR, RUBBER COMPOSITION, TIRE, AND RUBBER BELT

(71) Applicant: UBE ELASTOMER CO. LTD., Tokyo (JP)

(72) Inventors: Yuuki Takahashi, Ichihara (JP); Yuuji Hirai, Ichihara (JP)

(73) Assignee: UBE ELASTOMER CO. LTD., Tokyo (JP)

( * ) Notice: Subject to any disclaimer, the term of this patent is extended or adjusted under 35 U.S.C. 154(b) by 416 days.

(21) Appl. No.: 17/996,582

(22) PCT Filed: Apr. 26, 2021

(86) PCT No.: PCT/JP2021/016694
§ 371 (c)(1),
(2) Date: Oct. 19, 2022

(87) PCT Pub. No.: WO2021/221029
PCT Pub. Date: Nov. 4, 2021

(65) Prior Publication Data
US 2023/0203282 A1    Jun. 29, 2023

(30) Foreign Application Priority Data
Apr. 27, 2020    (JP) .................................. 2020-078170

(51) Int. Cl.
*C08L 9/00*       (2006.01)
*B60C 1/00*       (2006.01)
(Continued)

(52) U.S. Cl.
CPC .................. *C08L 9/00* (2013.01); *B60C 1/00* (2013.01); *C08F 6/10* (2013.01); *C08F 136/06* (2013.01); *C08L 25/10* (2013.01)

(58) Field of Classification Search
CPC ... C08L 9/00; C08L 25/10; B60C 1/00; C08F 6/10; C08F 136/06
See application file for complete search history.

(56) References Cited

U.S. PATENT DOCUMENTS

| | | | |
|---|---|---|---|
| 5,753,365 A * | 5/1998 | Morimoto ............. | B60C 11/005 428/407 |
| 2015/0054192 A1* | 2/2015 | Nakahara ................ | B29C 48/92 264/211.12 |
| 2018/0002457 A1 | 1/2018 | Tsuji et al. | |

FOREIGN PATENT DOCUMENTS

| | | |
|---|---|---|
| CA | 972499 A | 8/1975 |
| JP | S49017666 B1 | 5/1974 |

(Continued)

OTHER PUBLICATIONS

Pan et al, Synthesis of high crystalline syndiotactic 1,2-polybutadienes and study on their reinforcing effect on cis-1,4 polybutadiene, 2017, Polymer vol. 111, p. 20-26 (Year: 2017).*

(Continued)

*Primary Examiner* — Mark Eashoo
*Assistant Examiner* — Caitlin Norine Illing
(74) *Attorney, Agent, or Firm* — KNOBBE, MARTENS, OLSON & BEAR, LLP

(57) ABSTRACT

A polybutadiene composition that is excellent in hardness of a rubber composition, in processability and extrusion dimensional stability, and in physical properties. The polybutadiene composition includes polybutadiene rubber and syndiotactic-1,2-polybutadiene, and the polybutadiene composition has an interfacial component between the polybutadiene rubber and the syndiotactic-1,2-polybutadiene, and the interfacial component has a thickness of 40 to 55 nm as measured by an atomic force microscope.

9 Claims, 3 Drawing Sheets

(51) Int. Cl.
*C08F 6/10* (2006.01)
*C08F 136/06* (2006.01)
*C08L 25/10* (2006.01)

(56) References Cited

FOREIGN PATENT DOCUMENTS

| | | |
|---|---|---|
| JP | S49017667 B1 | 5/1974 |
| JP | 2000-044633 A | 2/2000 |
| JP | 2003040919 A | 2/2003 |
| JP | 2013-227522 A | 11/2013 |
| JP | 2018-044146 A | 3/2018 |
| JP | 2019-056073 A | 4/2019 |
| KR | 10-2014-0119171 A | 10/2014 |
| WO | WO 2016/104745 A1 | 6/2016 |

OTHER PUBLICATIONS

International Preliminary Report on Patentability dated Nov. 10, 2022 for corresponding PCT Application No. PCT/JP2021/016694, filed Apr. 26, 2021 in 6 pages.
Korean Office Action received in Korean Patent Application No. 10-2022-7041016 dated Apr. 11, 2025.

\* cited by examiner

POLYBUTADIENE COMPOSITION, PRODUCTION METHOD THEREFOR, RUBBER COMPOSITION, TIRE, AND RUBBER BELT

This application is the U.S. National Phase under 35 U.S.C. § 371 of International Application PCT/JP2021/016694, filed Apr. 26, 2021, designating the U.S., and published in Japanese as WO 2021/221029 on Nov. 4, 2021 which claims priority to Japanese Patent Application No. 2020-078170, filed Apr. 27, 2020, the entire content of which is incorporated herein by reference.

TECHNICAL FIELD

The present invention relates to a polybutadiene composition, a production method thereof, a rubber composition, a tire, and a rubber belt.

BACKGROUND ART

Polybutadiene compositions comprising syndiotactic-1,2-polybutadiene are known as materials that can improve in mechanical properties and the like of products (rubber compositions, tires, and the like) as compared to conventional polybutadiene rubber.

Polybutadiene compositions comprising syndiotactic-1,2-polybutadiene having specific tear strength and flexural crack resistance are disclosed (Patent Documents 1 and 2).

Moreover, polybutadiene compositions comprising syndiotactic-1,2-polybutadiene having specific formability, a tensile stress, tensile strength, and flexural crack growth resistance are disclosed (Patent Documents 3 to 6).

CITATION LIST

Patent Document

Patent Document 1: Japanese Patent Publication No. 49-17666
Patent Document 2: Japanese Patent Publication No. 49-17667
Patent Document 3: Japanese Patent Laid-Open No. 2000-44633
Patent Document 4: Japanese Patent Laid-Open No. 2018-44146
Patent Document 5: Japanese Patent Laid-Open No. 2019-56073
Patent Document 6: Japanese Patent Laid-Open No. 2013-227522

SUMMARY OF THE INVENTION

Technical Problem

However, Patent Documents 1 to 6 disclose no polybutadiene composition comprising syndiotactic-1,2-polybutadiene excellent in processability, extrusion dimensional stability and hardness.

An object of the present invention is to provide a polybutadiene composition that is excellent in hardness of a rubber composition, also excellent in processability and extrusion dimensional stability, and further excellent in physical properties balance of processability, extrusion dimensional stability, and hardness, and a method for producing the polybutadiene composition.

Solution to Problem

The present invention relates to the following:

[1] A polybutadiene composition comprising polybutadiene rubber and syndiotactic-1,2-polybutadiene, wherein
the polybutadiene composition has an interfacial component between the polybutadiene rubber and the syndiotactic-1,2-polybutadiene, and
the interfacial component has a thickness of 40 to 55 nm as measured by an atomic force microscope.

[2] The polybutadiene composition of [1], wherein the interfacial component has a content of 0.1 to 2.0% by mass.

[3] The polybutadiene composition of [1] or [2], wherein a ratio of a content of the interfacial component to a content of the syndiotactic-1,2-polybutadiene is 0.01 to 0.02.

[4] The polybutadiene composition of any one of [1] to [3], wherein a numerical value (SPB size index) obtained by multiplying a reciprocal of the number of syndiotactic-1,2-polybutadiene per unit area measured with an atomic force microscope by 1,000 is 1 to 5.

[5] The polybutadiene composition of any one of [1] to [4], wherein a numerical value obtained by dividing a content of the interfacial component by the SPB size index is 0.1 to 0.6.

[6] A rubber composition comprising the polybutadiene composition of any one of [1] to [5].

[7] A tire using the rubber composition of [6].

[8] A rubber belt using the rubber composition of [6].

[9] A method for producing a polybutadiene composition, comprising steps of
cis-1,4-polymerization of 1,3-butadiene,
syndiotactic-1,2-polymerization of 1,3-butadiene in a polymerization reaction mixture obtained in the previous step, and
desolventizing, and dehydrating and drying the polybutadiene composition obtained in the previous step, wherein
the step of desolventizing, and dehydrating and drying the polybutadiene composition comprises steps of
desolventization by hydrothermal treatment, and
dehydration and drying by applying heat, shearing and squeezing force, and
a polybutadiene composition obtained in the step of desolventizing, and dehydrating and drying the polybutadiene composition has a thickness of an interfacial component of 40 to 55 nm.

[10] The method for producing a polybutadiene composition of [9], wherein the step of dehydration and drying by applying heat, shearing and squeezing force comprises a step of dehydration and drying with a screw compression squeezer and an expansion-type extrusion dryer.

[11] The method for producing a polybutadiene composition of [10], wherein the step of dehydration and drying with a screw compression squeezer and an expansion-type extrusion dryer is a step of dehydration and drying with the expansion-type extrusion dryer after carrying out dehydration and drying with the screw compression squeezer.

[12] The method for producing a polybutadiene composition of [10] or [11], wherein operating conditions of the screw compression squeezer are an internal temperature of 75 to 155° C. and a tip pressure of 0.1 to 3.0 MPa.

[13] The method for producing a polybutadiene composition of any one of [10] to [12], wherein operating conditions of the expansion-type extrusion dryer are an internal temperature of 70 to 140° C. and a tip pressure of 5 to 13 MPa.

Advantageous Effects of Invention

According to the present invention, it is possible to provide a polybutadiene composition that is excellent in hardness of a rubber composition, and also excellent in processability and extrusion dimensional stability, and further excellent in physical properties balance of processability, extrusion dimensional stability, and hardness, and a method for producing the polybutadiene composition.

DESCRIPTION OF EMBODIMENTS

<Polybutadiene Composition>

Figure 1:
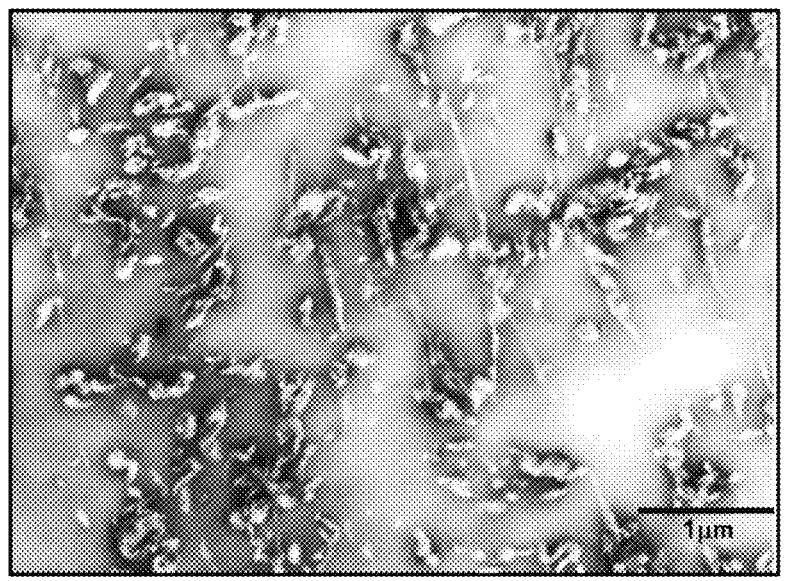
FIG. 1 is a transmission electron microscope (TEM) photograph of a polybutadiene composition. The polybutadiene composition is known that syndiotactic-1,2-polybutadiene (SPB) is dispersed in polybutadiene rubber.

The polybutadiene composition of the present invention comprises polybutadiene rubber and syndiotactic-1,2-polybutadiene, and has an interfacial component between the polybutadiene rubber and the syndiotactic-1,2-polybutadiene, a thickness of which as measured by an atomic force microscope is 40 to 55 nm. In the polybutadiene composition, the polybutadiene rubber is a matrix and the syndiotactic-1,2-polybutadiene is a domain.

(Polybutadiene Rubber)

The polybutadiene rubber is obtained by cis-1,4-polymerization of 1,3-butadiene. The polybutadiene rubber is a matrix component in the polybutadiene composition. The polybutadiene rubber is preferably high cis-1,4-polybutadiene. In order to improve various rubber physical properties (tensile stress, low fuel consumption, abrasion resistance, or the like) when formed into a rubber composition, a content of cis-1,4-form is preferably 90 to 100%, more preferably 95 to 100%, and particularly preferably 97% to 100%.

A Mooney viscosity ($ML_{1+4}$ (100° C.)) that is an index of hardness and processability is preferably 10 to 80, more preferably 10 to 65, and particularly preferably 15 to 50 in order to achieve both hardness of the rubber composition, and extrusion dimensional stability and processability of the polybutadiene composition.

A numerical value obtained by dividing a toluene solution viscosity by the Mooney viscosity (Tcp/$ML_{1+4}$ (100° C.)), which is an index of linearity, is preferably 1.0 and 4.0, more preferably 1.5 to 3.5, and particularly preferably 2.0 to 3.0 in order to achieve both hardness of the rubber composition and extrusion dimensional stability and processability of the polybutadiene composition. The molecular weight (Mw) thereof is preferably 100,000 to 800,000 and particularly preferably 200,000 to 600,000. The molecular weight distribution (Mw/Mn) thereof is preferably of 1.5 to 4.0 and particularly preferably 1.5 to 3.0.

(Syndiotactic-1,2-polybutadiene)

Syndiotactic-1,2-polybutadiene (hereinafter also referred to as SPB) is obtained by syndiotactic-1,2-polymerization of 1,3-butadiene. SPB is a crystalline resin that serves as the domain in the polybutadiene composition, and a SPB-containing rubber composition enables hardness and mechanical properties thereof to be improved. Moreover, by controlling the structure, size, and dispersion state of SPB, the hardness of the rubber composition and the extrusion dimensional stability of the polybutadiene composition can be improved.

The melting point (Tm) of SPB is preferably 150 to 220° C. and more preferably 180 to 210° C. in order to improve the hardness of the rubber composition. The molecular weight (Mw) is preferably 100,000 to 800,000 and particularly preferably 150,000 to 500,000. The content of 1,2-form is preferably 90 to 100%, more preferably 95 to 100%, and particularly preferably 98 to 100%. Stereoregularity (syndiotacticity rr) of the 1,2-structure is preferably 95 to 100%, more preferably 98 to 100%, and particularly preferably 99 to 100%.

(Interfacial Component)

The interfacial component (IF) is a component present between polybutadiene rubber and syndiotactic-1,2-polybutadiene in the polybutadiene composition of the present invention. The interfacial component is a component in which the rubber (polybutadiene rubber) and the resin (syndiotactic-1,2-polybutadiene) are physically or chemically mixed with each other, the adhesion between the rubber and the resin can be improved.

The thickness of the interfacial component ($T_{IF}$) is 40 to 70 nm and is more preferably 40 to 55 nm, and particularly preferably 40 to 50 nm. As a result, the polybutadiene composition is excellent in processability and extrusion dimensional stability, and also is excellent in hardness when the polybutadiene composition is used as the rubber composition.

(Measurement of Thickness of Interfacial Component ($T_{IF}$) by Atomic Force Microscope (AFM))

The thickness of the interfacial component ($T_{IF}$) is determined by measurement using an atomic force microscope (AFM). The thickness of the interfacial component ($T_{IF}$) can be determined by an evaluation step 1 of fabricating a crosslinked product suitable for structural analysis, and an evaluation step 2 of measuring the thickness of the interfacial component ($T_{IF}$) by AFM observation.

(Evaluation Step 1) Preparation of Crosslinked Product

The crosslinked product is a rubber composition obtained by blending a crosslinking agent and various chemicals normally used in rubber industries, for example, a vulcanization accelerator, an antioxidant, an anti-scorch agent, zinc oxide, and stearic acid for the polybutadiene composition, then heat pressing the mixture at a desired temperature and pressure to crosslink it.

It is possible to carry out AFM measurement by evaluation step 2 described below without preparing a crosslinked product, however, the crosslinked product is preferably prepared from the viewpoint of ease of AFM observation and improvement on quality of an elastic modulus image obtained by AFM. Crosslinking occurs mainly within polybutadiene rubber that is the matrix of the polybutadiene composition. Unlike the rubber components (polybutadiene rubber and the like), the interfacial component (IF) is insoluble in good solvents such as hexane and has a higher elastic modulus than the rubber component, making it difficult for a chemical such as a crosslinking agent or the like to penetrate into IF. Thus, the thickness of the interfacial component after crosslinking is substantially the same as that of the interfacial component before crosslinking. Moreover, the thickness of the interfacial component is calculated by using a normalized value according to (Expression 1) described below, and thereby the thickness of the interfacial component ($T_{IF}$) of the polybutadiene composition can be determined by measuring the thickness of the interfacial component of the crosslinked product.

The crosslinking agent is not particularly limited, and examples thereof include sulfurs such as powdered sulfur, precipitated sulfur, colloidal sulfur, insoluble sulfur, and highly dispersible sulfur; sulfur halides such as sulfur monochloride and sulfur dichloride; organic peroxides such as dicumyl peroxide and ditertiary butyl peroxide; azo-based radical initiators such as 2,2'-azobisisobutyronitrile (AIBN), 2,2'-azobis-2-methylbutyronitrile (AMBN), 2,2'-azobis-2,4-dimethylvaleronitrile (ADVN), 2,2'-azobis-4-azobiscyanovaleric acid (salt) (ACVA); quinone dioximes such as p-quinone dioxime and p,p'-dibenzoylquinone dioxime; organic polyvalent amine compounds such as triethylenetetramine, hexamethylenediamine carbamate, 4,4'-methylenebis-o-chloroaniline; an alkylphenol resin with methylol group; and metal oxides such as magnesium oxide. Among these, sulfur is preferred.

The amount of the sulfur crosslinking agent used may be appropriately selected depending on the situation, and it is preferably in the range of 0.1 to 10 parts by mass and more preferably 0.1 to 3 parts by mass, as a sulfur content based on 100 parts by mass of the polybutadiene composition.

The amount of zinc oxide used may be selected as appropriate depending on the situation, and it is preferably in the range of 0.1 to 10 parts by mass and more preferably 0.1 to 3 parts by mass, as a zinc oxide content based on 100 parts by mass of the polybutadiene composition.

The vulcanization accelerator is not particularly limited, and examples thereof may include thiazole-based vulcanization accelerators, such as 2-mercaptobenzothiazole and dibenzothiazyl disulfide, sulfenamide-based vulcanization accelerators, such as N-cyclohexyl-2-benzothiazolylsulfenamide, N-(tert-butyl)-2-benzothiazolylsulfenamide, N,N-dicyclohexyl-2-benzothiazolylsulfenamide, and N-oxydiethylene-2-benzothiazolylsulfenamide, and guanidine-based vulcanization accelerators, such as 1,3-diphenylguanidine, and the amount of the accelerator compounded is preferably 0.1 to 5.0 parts by mass and more preferably 0.1 to 3.0 parts by mass based on 100 parts by mass of the polybutadiene composition.

Furthermore, examples of the antioxidant include N-isopropyl-N'-phenyl-p-phenylenediamine, N-(1,3-dimethylbutyl)-N'-phenyl-p-phenylenediamine, 2,2,4-trimethyl-1,2-dihydroquinoline polymer, 6-ethoxy-2,2,4-trimethyl-1,2-dihydroquinoline, and an elevated-temperature condensation product of diphenylamine and acetone. The amount thereof used is preferably 0.1 to 6.0 parts by mass and more preferably 0.1 to 3.0 parts by mass based on 100 parts by mass of the polybutadiene composition.

The antioxidant blooms out on the surface of the crosslinked product, and an image that can be acquired by AFM may not be clear. Therefore, the antioxidant may not be used.

A method for blending the crosslinking agent and various chemicals into the polybutadiene composition upon preparation of the crosslinked product is not particularly limited, and examples thereof include a preparation method by compounding them using a mixing machine such as a Banbury mixer, a biaxial roll, or an internal mixer.

A compounding temperature upon compounding of the polybutadiene composition with the crosslinking agent and various chemicals is preferably 0 to 120° C. and more preferably 20 to 80° C. A compounding time is preferably 30 seconds to 30 minutes and more preferably 1 minute to 10 minutes.

A method for heating the compound is not particularly limited and is preferably a method for forming the resulting compound into a sheet and heat pressing it. A temperature upon heating is usually 120 to 200° C., and a time for heat pressing is usually 1 to 100 minutes. Crosslinking proceeds with heat pressing, and a desired crosslinked product is obtained.

(Evaluation Step 2) Measurement of Thickness of Interfacial Component ($T_{IF}$) by AFM Observation The AFM is a type of scanning probe microscope that obtains information on a sample surface by utilizing an atomic force between the sample and the probe, and by controlling a distance between the sample and the probe equipped on the cantilever, force acting on the probe (an amount of the cantilever deflected) can be measured to evaluate a shape of the sample surface and various physicochemical properties such as an elastic modulus of the sample surface.

As the AFM available, a MultiMode8 manufactured by Bruker Japan Corporation, an E-sweep manufactured by Hitachi High-Tech Science Corporation, an MFP-3DAFM family manufactured by Oxford Instruments Asylum Research Inc., and the like are exemplified, but not limited thereto.

A shape and size of a sample piece used for AFM observation are not particularly limited as long as they have a size that can be placed on an AFM sample table. A cryomicrotome, a knife, scissors, razors, or the like may be used as appropriate for shape-forming a crosslinked product. In particular the cryomicrotome is suitable for AFM observation because the smoothest surface can be formed on the sample piece.

In AFM observation, an appropriate measurement mode provided by the AFM system is used. Examples of the typical AFM measurement mode include a contact mode, a tapping mode, and a non-contact mode. A force modulation mode in which hardness of a micro region of a surface of a sample piece is measured, or a force volume mode in which distribution of an elastic modulus or Young's modulus on a surface of a sample piece can be measured, may also be selected. The particularly preferred measurement mode is the force volume mode in which differences in dynamical properties of a micro region of a sample piece can be imaged, or a peak force QNM mode in which a force curve is measured at high speed and an actual palpation pressure is fed back from its values. In the force volume mode or the peak force QNM mode, an elastic modulus is measured for each micro region on a surface of a sample piece, thereby a mapping image of the elastic modulus can be obtained. The mapping image herein is referred to as "elastic modulus image."

Figure 2:
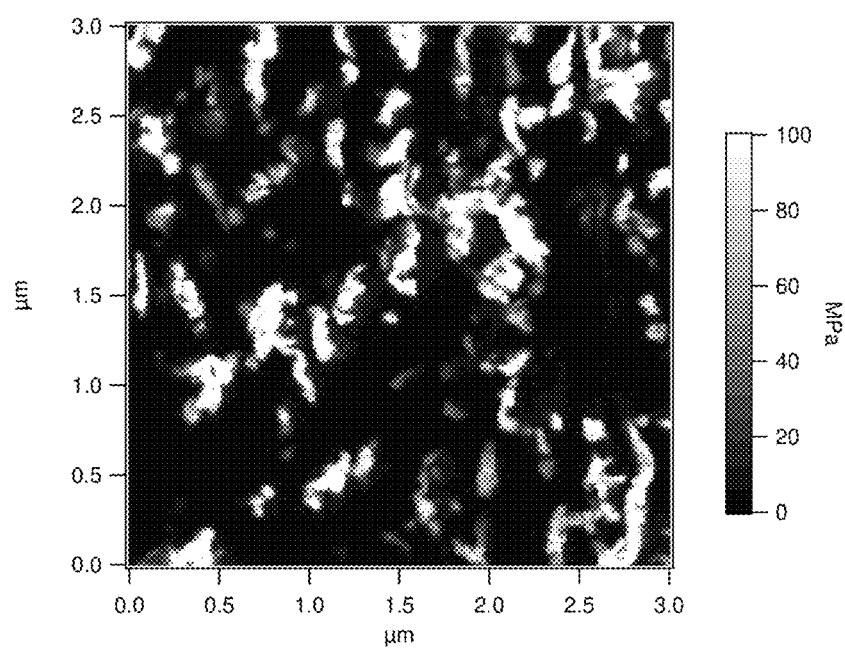
FIG. 2 is an elastic modulus image of a polybutadiene composition by atomic force microscope (AFM) measurement. This data is used to determine an interfacial thickness of the polybutadiene composition of the present invention.

The elastic modulus image enables discrimination of the components of the polybutadiene composition. The polybutadiene composition of the present invention consists of polybutadiene rubber as the matrix, SPB as the domain, and the interfacial component (IF). The elastic modulus of polybutadiene rubber is usually the smallest, ranging from about 1 to 20 MPa. The elastic modulus of SPB is one order of magnitude or greater than that of the polybutadiene rubber and is 100 MPa or larger. The interfacial component (IF) has a numerical value therebetween, ranging from 20 to 100 MPa (see FIG. 2).

Figure 3:
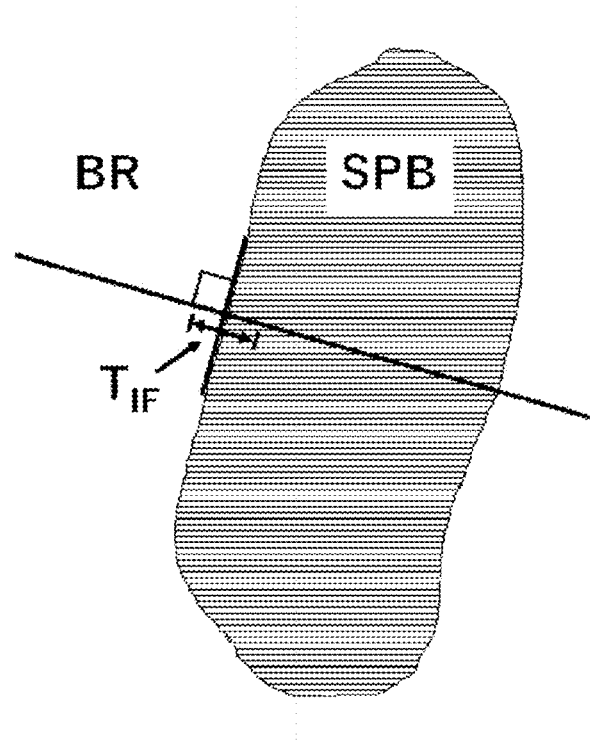
FIG. 3 is a view illustrating an interfacial thickness measurement region of the polybutadiene composition of the present invention.
Figure 4:
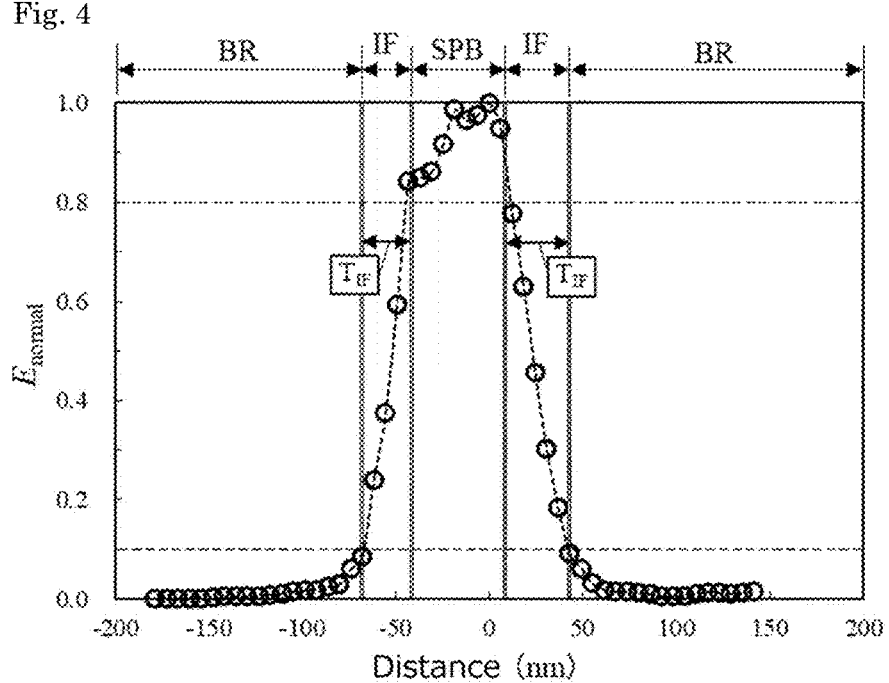
FIG. 4 is a graph illustrating a definition of interface thickness of the polybutadiene composition of the present invention.

The elastic modulus image acquired is used to define a method for measuring a thickness of the interfacial component ($T_{IF}$). FIG. 3 shows a measurement image. FIG. 4 also shows a measurement example.

In measurement, a straight line across the SPB, i.e., from a polybutadiene (BR) portion to a BR portion on the opposite side of the SPB portion, is a measurement region. In this case, as shown in FIG. 3, the straight line in the measurement region usually traverses interfacial component (IF) phases at two locations with the SPB portion therebetween, and the straight line is to be perpendicular to at least one of the interfacial component phases.

The elastic modulus of the interfacial component (IF) increases from the polybutadiene rubber (BR) portion to the SPB portion like a slope. The elastic modulus of the polybutadiene rubber portion and the SPB portion vary depending on the characteristics of the polybutadiene composition (molecular weight, crosslink density, Tm, and the like), a measurement area, and AFM measurement conditions, and for such and other reasons, it is rather difficult to determine whether it is IF by the absolute value of the elastic modulus. Therefore, a normalized value $E_{normal}$ is used according to the following (Expression 1). E denotes the measured elastic modulus value by AFM and $E_{min}$ denotes the minimum elastic modulus value in the measurement region, and $E_{max}$ denotes the maximum elastic modulus value in the measurement region.

[Expression 1]

$$E_{normal} = \frac{E - E_{min}}{E_{max} - E_{min}} \quad \text{(expression 1)}$$

The elastic modulus of the interfacial component (IF) herein is defined as a range having an $E_{normal}$ ranging from 0.1 to 0.8. Therefore, the thickness of the interfacial component ($T_{IF}$) is defined as the distance ($T_{IF}$) from the position at $E_{normal}$ of 0.1 to the position at $E_{normal}$ of 0.8 (see FIG. 4).

It is noted that the thickness of the interfacial component ($T_{IF}$) is an average of thicknesses at 30 locations of the interfacial component phase perpendicular to the straight line of the measurement region described above.

(Measurement of the Number of SPBs Per Unit Area by AFM)

The number of SPBs within an image can be calculated from an elastic modulus image acquired in the same manner as in the measurement of the thickness of the interfacial component ($T_{IF}$). Specifically, the number of SPBs per unit area (36 μm²) ($n_{SPB}$) is calculated by the following method.

Figure 5:
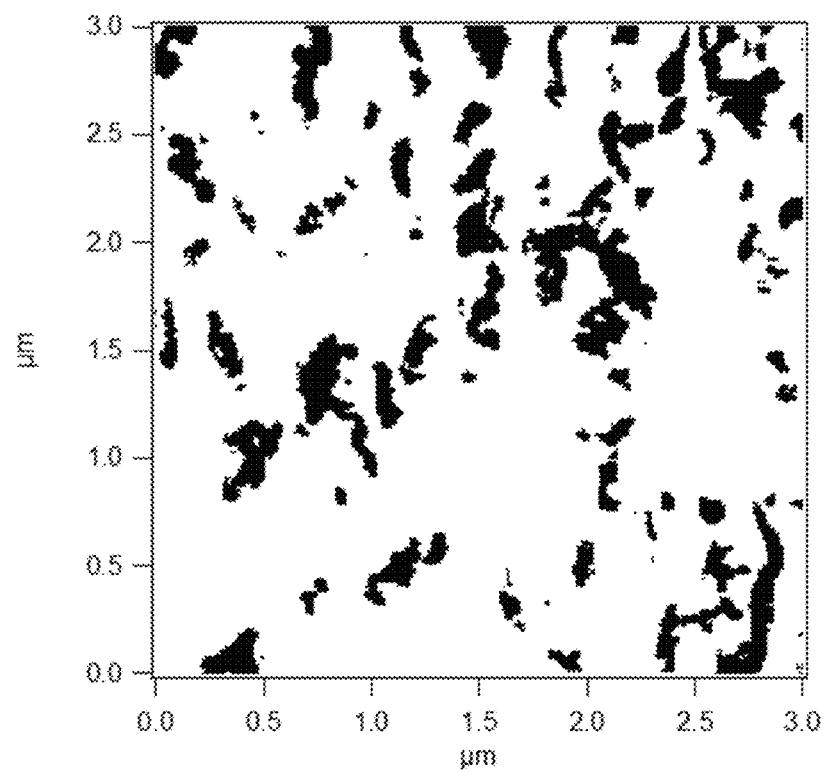
FIG. 5 is a view obtained by converting an elastic modulus image obtained by AMF measurement into a binarized image. This data is used to determine a SPB size index ($\phi_{SPB}$) of the polybutadiene composition of the present invention.

For an image (3 μm×3 μm) of an elastic modulus image obtained by AFM measurement, locations with elastic modulus of 50 MPa or larger are blacked out as SPBs, and locations with elastic modulus of smaller than 50 MPa are whited out as the rubber components (polybutadiene rubber) and converted into a black and white-binarized image (see FIG. 5). In the binarized image obtained, domains with a size of 10 pixels squared or more are counted as SPB domains. In order to reduce variation in the number of SPBs in different observation locations, elastic modulus images are acquired from four different locations, and a sum of the number of SPBs in the four images is determined as the number of SPBs ($n_{SPB}$).

(SPB Size Index ($\phi_{SPB}$))

The SPB size index ($\phi_{SPB}$) is a numerical value obtained by multiplying the reciprocal of the number of SPBs ($n_{SPB}$), $1/n_{SPB}$, by 1,000 and is an index denoting a size of SPB. The SPB size index ($\phi_{SPB}$) is preferably 1 to 10 and more preferably 1 to 5. Within the range of the SPB size, a polybutadiene composition excellent in the physical properties balance of processability, extrusion dimensional stability, and hardness can be obtained.

(Characteristics of Polybutadiene Composition)

The Mooney viscosity ($ML_{1+4}(100°\ C.)$) of the polybutadiene composition is preferably 35 to 65. Within in this range, a polybutadiene composition excellent in processability can be obtained.

The swell of the polybutadiene composition is an index of extrusion dimensional stability, and the swell that can be defined as the ratio between the cross-sectional area of the extrusion specimen to the cross-sectional area of the die opening, is preferably 1.69 or less.

Hardness of the polybutadiene composition can be determined by measuring hardness of the polybutadiene composition crosslinked product at room temperature according to JIS K6253, and it is preferably 50 or more.

The physical properties balance index of the polybutadiene composition is a value obtained by dividing hardness by the Mooney viscosity ($ML_{1+4}(100°\ C.)$) and the swell and is an index denoting the physical properties balance of processability, extrusion dimensional stability, and hardness. The physical properties balance index is preferably 0.70 or more and more preferably 0.74 or more.

(Proportion of Each Component in Polybutadiene Composition)

The content of SPB in the polybutadiene composition ($F_{SPB}$) is preferably 1 to 50% by mass in order to achieve both hardness of the rubber composition, and processability and extrusion dimensional stability of the polybutadiene composition. It is more preferably 2 to 30% by mass and particularly preferably 3 to 25% by mass.

The content of SPB ($F_{SPB}$) can be determined by measuring the vinyl structure ratio using infrared spectroscopy (FT-IR).

The content of the interfacial component ($F_{OR}$) is preferably 0.1 to 6.0% by mass and more preferably 0.1 to 2.0% by mass from the viewpoint of the physical properties balance of processability and extrusion dimensional stability of the polybutadiene composition, and hardness of the rubber composition.

Since the interfacial component (IF) is insoluble in a good solvent (for example, n-hexane) of polybutadiene rubber, the content of the interfacial component ($F_{OR}$) can be obtained from (Expression 2).

$F_{OR}$ (% by mass)=Hexane insoluble fraction ($HI$)– Content of $SPB$ ($F_{SPB}$) \quad (Expression 2)

It is noted that the hexane insoluble fraction (HI) in the above (Expression 2) is the extracted residue after having extracted the polybutadiene composition with a good solvent of polybutadiene rubber (n-hexane, cyclohexane, n-heptane, toluene, benzene, xylene, or the like) by Soxhlet extraction and contains SPB and the interfacial component.

The proportion of the content of the interfacial component ($F_{OR}$) to the content of SPB ($F_{SPB}$), $F_{OR}/F_{SPB}$, is preferably 0.01 to 0.50, more preferably 0.02 to 0.40, and particularly preferably 0.02 to 0.20 from the viewpoint of the physical properties balance of processability and extrusion dimensional stability of the polybutadiene composition, and hardness of the rubber composition.

The numerical value obtained by dividing the content of the interfacial component ($F_{OR}$) by the SPB size index ($\phi_{SPB}$), $F_{OR}/\phi_{SPB}$, is an index indicating efficient formation of the interfacial component, and is preferably 0.05 to 0.7, more preferably 0.1 to 0.7, and particularly preferably 0.1 to 0.6 from the viewpoint of the physical properties balance of processability and extrusion dimensional stability of the polybutadiene composition, and hardness of the rubber composition.

Increasing the interfacial component results in increasing a harder component than a normal polybutadiene rubber component, thereby improving hardness and extrusion dimensional stability. On the other hand, the processability is deteriorated, so that it is not preferred to increase the interfacial component too much. Then, it is of importance to adjust the interfacial component within an appropriate range.

Thus, as physical property values associated with the interfacial component, a thickness of the interfacial component ($T_{IF}$) within a specific range of 40 to 55 nm, and preferably the content of the interfacial component ($F_{OR}$), a proportion of the content of the interfacial component ($F_{OR}$) to the content of SPB ($F_{SPB}$), $F_{OR}/F_{SPB}$, and the numerical value obtained by dividing the content of the interfacial component ($F_{OR}$) by the SPB size index ($\phi_{SPB}$), $F_{OR}/\phi_{SPB}$, which are adjusted within appropriate ranges, enable the physical properties balance of processability, extrusion dimensional stability, and hardness to be improved.

The hardness, extrusion dimensional stability, and processability can be included as general rubber physical properties, and the physical property values related to the aforementioned interfacial component that are adjusted within appropriate ranges enable physical properties balance in various rubber products to be improved.

For example, in tires, an elastic modulus can be increased by increasing the interfacial component. As a result, steering stability of the tread component can be enhanced. In the case of the sidewall component, the strength can be enhanced, leading to reduce thickness or weight, which in turn contributes to improved low fuel consumption. Moreover, molding processability and extrusion dimensional stability can be improved when forming into a rubber composition for tires. Therefore, the physical property values related to the interfacial component that are adjusted within appropriate ranges enable balance between hardness-related physical properties (elastic modulus, steering stability, strength, and the like), molding processability, and extrusion dimensional stability to be improved.

Moreover, in shoes, mainly as a rubber composition for shoe soles, the molding processability and dimensional stability can be enhanced by increasing the interfacial component. Furthermore, the hardness or elastic modulus can be enhanced, thereby amount of filler can be reduced, contributing to weight reduction of shoes. Therefore, the physical property values related to the interfacial component that are adjusted within appropriate ranges enable the balance between hardness-related physical properties (elastic modulus, weight reduction, and the like), and molding processability and dimensional stability to be improved.

Further, in industrial parts, the molding processability and extrusion dimensional stability can be enhanced as a rubber composition for various industrial parts, such as rubber belts, rubber hoses, and anti-vibration rubber. Moreover, the hardness or elastic modulus can be increased as necessary, contributing to improved durability of industrial parts. In addition, a filler can be reduced, contributing to weight reduction of industrial parts. Therefore, the physical property values related to the interfacial component that are adjusted within appropriate ranges enable balance between hardness-related physical properties (elastic modulus, durability, weight reduction, and the like), and molding processability and extrusion dimensional stability to be improved.

In golf balls, the molding processability can be improved while maintaining hardness and high resilience as a rubber composition for golf balls used mainly as a base material. Hardness can be increased, thereby enabling an elastic modulus, tensile strength, and impact strength in golf balls to be increased. Thus, the physical property values related to the interfacial component that are adjusted within appropriate ranges enable balance between hardness-related physical properties (high resilience, elastic modulus, strength, and the like) and molding processability to be improved.

<Production Method of Polybutadiene Composition>

The method for producing a polybutadiene composition comprises a step (production step 1) of cis-1,4-polymerization of 1,3-butadiene, a step (production step 2) of syndiotactic-1,2-polymerization of 1,3-butadiene in the polymerization reaction mixture obtained in the previous polymerization step, and a step (production step 3) of desolventizing, and dehydrating and drying the polybutadiene composition.

(Production Step 1)

Production step 1 is a step of cis-1,4-polymerization of 1,3-butadiene, wherein a mixed solution obtained by dissolving 1,3-butadiene in an inert organic solvent containing a hydrocarbon as a major component is prepared, and to the mixed solution is added a catalyst composed of water, an organic aluminum compound, and a soluble cobalt compound for cis-1,4-polymerization of 1,3-butadiene.

Examples of the inert organic solvent composed mainly of a hydrocarbon include aromatic hydrocarbons such as toluene, benzene, and xylene; aliphatic hydrocarbons such as n-hexane, butane, heptane, and pentane; alicyclic hydrocarbons such as cyclopentane and cyclohexane; olefinic hydrocarbons such as the aforementioned olefin compounds, cis-2-butene, and trans-2-butene, hydrocarbon solvents such as mineral spirits, solvent naphtha, and kerosene, and halogenated hydrocarbon solvents such as methylene chloride. A 1,3-butadiene monomer itself may also be used as a polymerization solvent.

Among the above inert organic solvents, toluene, cyclohexane, a mixture of cis-2-butene and trans-2-butene, or the like is suitably used.

Next, a concentration of water in the obtained mixed solution is adjusted. The molar concentration of water in the aforementioned mixed solution is preferably in the range of 0.2 to 3.0 mM and particularly preferably 0.5 to 3.0 mM. The concentration within this range increases catalytic activity and the content of a cis-1,4-structure. Moreover, the molecular weight can be appropriately adjusted, and generation of gel during polymerization can be suppressed. A well-known method for adjusting the concentration of water can be applied.

To a solution obtained by adjusting a concentration of water is added an organic aluminum compound. Examples of the organic aluminum compound include trialkylaluminum, dialkylaluminum chloride, dialkylaluminum bromide, alkylaluminum sesquichloride, alkylaluminum sesquibromide, and alkylaluminum dichloride.

Examples of specific compounds thereof include trialkylaluminum such as trimethylaluminum, triethylaluminum, triisobutylaluminum, trihexylaluminum, trioctylaluminum, and tridecylaluminum.

Furthermore, dialkylaluminum chlorides such as dimethylaluminum chloride and diethylaluminum chloride, organic aluminum halogen compounds such as ethylaluminum sesquichloride and ethylaluminum dichloride, hydrogenated organic aluminum compounds such as diethylaluminum hydride, diisobutylaluminum hydride, and ethylaluminum sesquihydride are also included. Two or more of these organic aluminum compounds can be combined for use. Among them, combination of dimethylaluminum chloride, diethylaluminum chloride, and triethylaluminum is preferred. The combination of diethylaluminum chloride and triethylaluminum is particularly preferred in terms of capable of reducing gels.

The molar concentration of the organic aluminum compound is preferably 0.5 mM or more and particularly preferably 2.0 to 2.5 mM in the aforementioned mixed solution.

In the combined system of diethylaluminum chloride (DEAC) and triethylaluminum (TEA), a molar ratio of DEAC to TEA (DEAC/TEA) is preferably 1 to 10.

Next, the soluble cobalt compound is added to the mixture to which the organic aluminum compound is added, and cis-1,4-polymerization is performed. Examples of the soluble cobalt compound include such a cobalt compound that is soluble in an inert solvent composed mainly of a hydrocarbon solvent or in liquid 1,3-butadiene, or dispersible therein homogeneously, for example, β-diketone complexes of cobalt, such as cobalt (II) acetylacetonate, cobalt (III) acetylacetonate; β-keto acid ester complexes of cobalt such as a cobalt acetoacetate ethyl ester complex; cobalt salts of organic carboxylic acids having 6 or more carbon atoms, such as cobalt octoate, cobalt naphthenate, cobalt benzoate; and halogenated cobalt complexes, such as a cobalt pyridine chloride complex and a cobalt chloride ethyl alcohol complex. The molar concentration of the soluble cobalt compound is preferably 0.5 μM or more and particularly preferably 1.5 μM or more in the aforementioned mixed solution. The molar ratio of the organic aluminum chloride to the soluble cobalt compound (Al/Co) is 10 or more and particularly preferably 50 or more. In addition to the soluble cobalt compound, organic carboxylates of nickel, organic complex salts of nickel, organic lithium compounds, organic carboxylates of neodymium, and organic complex salts of neodymium can be used.

The cis-1,4-polymerization of 1,3-butadiene is carried out in a temperature range of more than 0° C. to 100° C., preferably 10 to 100° C., and particularly preferably 20 to 80° C. A polymerization time (average residence time) is preferably in the range of 5 minutes to 2 hours. The cis-1,4-polymerization is preferably carried out so that a polymer concentration after the cis-1,4-polymerization is 5 to 26% by weight. The polymerization is carried out in one tank, or in two or more tanks connected together. The polymerization is carried out by stirring and mixing a solution in a polymerization tank (polymerization vessel). The polymerization tank used for polymerization can be a polymerization tank with a stirrer for high viscosity liquid, for example, the apparatus described in Japanese Patent Publication No. 40-2645.

Upon cis-1,4-polymerization of the present invention, a well-known molecular weight modifiers, for example, non-conjugated dienes such as cyclooctadiene, allene, and methylallene (1,2-butadiene), or α-olefins such as ethylene, propylene, and butene-1, can be used. In addition, a well-known gelling inhibitor can be used in order to further suppress gel formation during polymerization.

(Production Step 2)

Production step 2 is a step of syndiotactic-1,2-polymerization of 1,3-butadiene in the polymerization reaction mixture obtained in production step 1. To the polymerization reaction mixture obtained in production step 1 are added a catalyst composed of carbon disulfide, an organic aluminum compound represented by the general formula $AlR_3$, and the soluble cobalt compound for syndiotactic-1,2-polymerization of 1,3-butadiene. At that time, 1,3-butadiene may or may not be added to the polymerization reaction mixture obtained in production step 1. Examples of the organic aluminum compound represented by the general formula $AlR_3$ suitably include trimethylaluminum, triethylaluminum, triisobutylaluminum, tri-n-hexylaluminum, and triphenylaluminum. A molar concentration of the organic aluminum compound in the aforementioned mixed solution is preferably 0.5 mM or more and particularly preferably 2.0 to 25 mM. It is also preferably 4 mM or more.

A molar concentration of the soluble cobalt compound is preferably 1.0 μM or more and particularly preferably 5 μM or more in the above mixture. It is also preferably 100 μM or less, or 35 μM or less in some cases.

The carbon disulfide is not particularly limited and is preferably water-free. A molar concentration of carbon disulfide in the above mixture is preferably 20 mM or less and particularly preferably 0.01 to 10 mM. A well-known phenyl isothiocyanate or xanthogenic acid compound may be used as a substitute for the carbon disulfide. Moreover, the carbon disulfide may be preliminarily added in production step 1.

A temperature of syndiotactic-1,2-polymerization is preferably −5 to 100° C. and particularly preferably 10 to 80° C. In addition, it is also preferably 20° C. or higher, for example, 30 to 70° C. A polymerization system in which 1 to 50 parts by weight of 1,3-butadiene, preferably 1 to 20 parts by weight thereof per 100 parts by weight of the polymerization reaction mixture obtained in the aforementioned production step 1 are added upon syndiotactic-1,2-polymerization enables a yield of SPB upon syndiotactic-1,2-polymerization to be increased. A polymerization time (average residence time) is preferably in the range of 5 minutes to 2 hours. The syndiotactic-1,2-polymerization is preferably carried out so that a polymer concentration after syndiotactic-1,2-polymerization is 9 to 29% by weight. The polymerization is carried out in one tank, or in two or more tanks connected together. The polymerization is carried out by stirring and mixing a polymerization solution in the polymerization tank (polymerization vessel). The polymerization tank used for the syndiotactic-1,2-polymerization can be a polymerization tank with a stirrer for high viscosity liquid, for example, the apparatus described in Japanese Patent Publication No. 40-2645, because a polymerization solution becomes further highly viscous during the syndiotactic-1,2-polymerization, then polymers can be adhered to the polymerization tank easily.

After the polymerization reaction reaches a predetermined polymerization rate, a well-known antioxidant can be added according to the usual method. Typical examples of the antioxidant include phenol-based 2,6-di-t-butyl-p-cresol (BHT), phosphorus-based trinonylphenyl phosphite (TNP), sulfur-based 4,6-bis(octylthiomethyl)-o-cresol, and dilauryl-3,3'-thiodipropionate (TPL). They may be used singly or in combination of two or more thereof, and the antioxidant is preferably added in an amount of 0.001 to 5 parts by weight based on 100 parts by weight of the polybutadiene composition.

A polymerization terminator can be added to the polymerization system to terminate polymerization as well. A polymerization terminator that is, for example, 1,4-naphthoquinone, is used. The amount (molar amount) of the polymerization terminator added is preferably 5 to 10 times or more the amount of the soluble cobalt compound added.

Further, a method for adding a large amount of an alcohol such as methanol or ethanol, or of a polar solvent such as water, a method for introducing an inorganic acid such as hydrochloric acid or sulfuric acid, an organic acid such as acetic acid or benzoic acid, or a hydrogen chloride gas to the polymerization solution, and the like are also mentioned, and the method for adding a large amount of water is particularly preferred. The amount (molar amount) of water added is preferably 5 to 10 times or more the amount of the organic aluminum compound added.

(Production Step 3)

Production step 3 is a step of desolventizing, and dehydrating and drying the polybutadiene composition obtained in production step 2. The polybutadiene composition can be desolventized, and dehydrated and dried by known methods, and the step of desolventization, and dehydration and drying preferably includes a step of desolventization by hydrothermal treatment, and a step of dehydration and drying by applying heat, shear, and squeezing force. By applying heat, shear, and squeezing force in the step of dehydration and drying, a polybutadiene composition having an interfacial thickness of 40 to 55 nm can be obtained.

The step of dehydration and drying by applying heat, shear, and squeezing preferably includes a step of dehydration and drying by using a screw compression squeezer (SDU) with a single-screw extruder structure, an expansion-type extrusion dryer (VCU), and a SDU/VCU integrated apparatus, a dehydration expansion process apparatus with a twin-screw kneading extruder structure, or the like, and it particularly preferably includes the step of dehydration and drying by the screw compression squeezer and the expansion-type extrusion dryer in order to improve dehydration and drying efficiency.

(Step of Desolventization)

Examples of the method of desolventization include vacuum drying and hydrothermal treatment (coagulation and stripping).

The vacuum drying is not particularly limited, and desolventization and drying can be carried out by vacuuming using a vacuum pump or the like in a thermostatic chamber which can withstand vacuum. The vacuum drying also serves as a step of dehydration and drying.

The hydrothermal treatment is not particularly limited and is preferably configured with a coagulator that forms polymer cement (polymer solution in which the polybutadiene composition is dissolved in an organic solvent) into crumb (fine particles of the polybutadiene composition), and a stripper that perform a desolventization treatment on the crumb with hot water (for example, an apparatus that reduces a residual solvent by atmospheric distillation). In the coagulator, the polymer cement is shredded by steam into crumb. The slurry (hot water containing crumb) from the coagulator is delivered to a stripper, where the residual solvent in the crumb can be reduced. Furthermore, the slurry is filtered through a filtering apparatus such as a filter to separate the hot water from the slurry and obtain only crumb.

(Step of Dehydration and Drying)

After the step of desolventization, a step of dehydration and drying is carried out. In the step of dehydration and drying, a dehydration and drying apparatus such as a vacuum dryer, a screw compression squeezer (SDU), or an expansion-type extrusion dryer (VCU), an SDU/VCU integrated apparatus, a twin-screw kneading extruder, or the like can be used. An apparatus capable of applying heat, shear, and squeezing force is preferred, and the screw compression squeezer and the expansion-type extrusion dryer are preferably combined for use to carry out the dehydration and drying. Moisture and a residual solvent contained in the crumb obtained in the above step can be removed to the minimum.

First, it is preferable to dehydrate the crumb obtained in the above step by using the screw compression squeezer. As an operating condition of the screw compression squeezer, an internal temperature is preferably 75 to 155° C. and more preferably 85 to 145° C. A tip pressure is preferably 0.1 to 3.0 MPa and more preferably 0.2 to 2.0 MPa. A screw rotation speed is preferably 1 to 50 rpm and more preferably 5 to 30 rpm. The conditions of the temperature, tip pressure, and screw rotation speed in the above ranges enable stable dehydration operation.

Next, evaporation of moisture is preferably carried out by an expansion-type extruder from the crumb that has undergone dehydration by the screw compression squeezer. The moisture content of the crumb can be further reduced. As an operating condition of the expansion-type extrusion dryer, an internal temperature is preferably 70 to 140° C. and more preferably 75 to 135° C. A tip pressure is preferably 5 to 13 MPa and more preferably 6 to 12 MPa. A screw rotation speed is preferably 5 to 60 rpm and more preferably 10 to 45 rpm. The conditions of the temperature, tip pressure, and screw rotation speed within the aforementioned ranges enable stable extrusion drying operation.

By using the screw compression squeezer and expansion-type extruder, heat, shear force and squeezing force are applied to the crumb. By setting the conditions of the temperature, the tip end pressure, and the screw rotation speed in the above-mentioned range, sufficient shearing and squeezing force can be applied to the crumb. With the shear force and squeezing force, the crumb is repeatedly elongated. By subjecting the crumb to heat or repetitive elongation, the optimal amount of interface components can be adjusted.

In production step 3, as described above, the polybutadiene composition crumb undergoes the step of applying heat, shear, and squeezing force, whereby a polybutadiene composition having an interface thickness of 40 to 55 nm can be obtained. As a result, a polybutadiene composition excellent in hardness of the rubber composition, and processability and extrusion dimensional stability of the polybutadiene composition, and excellent in physical properties balance, can be obtained.

The polybutadiene composition obtained through the dehydration and drying step may contain a small amount of moisture. Then, crumb can be dried by using a hot air dryer. A moisture content is preferably reduced to 0.7% by mass or less and further 0.5% by mass or less. The hot air dryer is not particularly limited, and examples thereof include an oven type, a drum type, a conveyor type, and a vibrating conveyor type. A hot air temperature of 80 to 120° C. is preferred, and a temperature of 85 to 115° C. is more preferred.

<Rubber Composition>

The rubber composition includes the aforementioned polybutadiene composition. Preferably the rubber composition further includes a rubber component other than the aforementioned polybutadiene composition and a reinforcing material.

Examples of the rubber component other than the polybutadiene composition include high cis polybutadiene rubber, low cis polybutadiene rubber, natural rubber (NR), polyisoprene rubber (IR), emulsion polymerization or solution polymerization styrene butadiene rubber (SBR), ethylene propylene diene rubber (EPDM), nitrile rubber (NBR), butyl rubber (IIR), and chloroprene rubber (CR).

Moreover, derivatives of the above rubber components, for example, polybutadiene rubber modified with a tin compound, and epoxy-modified, silane-modified, or maleic acid-modified rubber described above, can also be used, and these rubber components can be used singly or in combination of two or more thereof.

Examples of the reinforcing material include inorganic reinforcing materials such as carbon black, silica, activated calcium carbonate, and ultrafine particle magnesium silicate, and organic reinforcing materials such as a syndiotactic-1, 2-polybutadiene resin, a polyethylene resin, a polypropylene resin, a high styrene resin, a phenol resin, lignin, a modified melamine resin, a coumarone indene resin and a petroleum resin, and particularly preferably carbon black with a particle size of 90 nm or less and an amount of 70 ml/100 g or more of dibutyl phthalate (DBP) oil absorption, for example, FEF, FF, GPF, SAF, ISAF, SRF, and HAF. In addition, examples of silica include anhydrous silicic acid by a dry process, and hydrous silicic acid and synthetic silicate by a wet process.

The polybutadiene composition and the aforementioned reinforcing material can be compounded using a Banbury mixer, an open roll, a kneader, or a twin-screw kneader. A compounding temperature is preferably lower than the melting point of SPB contained in the polybutadiene composition. In a case in which the temperature is higher than the melting point of SPB, SPB in the polybutadiene composition melts and deforms from a shape with a high aspect ratio to a spherical particle shape, resulting in deterioration of rubber physical properties, which is not preferred.

The rubber composition may also be compounded with compounding agents normally used in the rubber industry, such as a vulcanizing agent, a vulcanization aid, an antioxidant, process oil, zinc oxide, and stearic acid if necessary.

As the vulcanizing agent, well-known vulcanizing agents, for example, sulfur, an organic peroxide, a resin vulcanizing agent, and metal oxides such as magnesium oxide, are used. Examples of the vulcanization assistant include well-known vulcanization aid, for example, aldehydes, ammonia, amines, guanidines, thioureas, thiazoles, thiurams, dithiocarbamates, and xanthates. Examples of the antioxidant include amine/ketone-based, imidazole-based, amine-based, phenol-based, sulfur-based, and phosphorus-based agents. The process oil for use may be any one of aromatic, naphthenic, or paraffinic oil.

<Tire and Rubber Belt>

The tire and the rubber belt are made from the rubber compositions described above.

The rubber composition is useful as tire rubber and is used for sidewalls, or, treads, stiffeners, bead fillers, inner liners, or carcasses, and others for rubber applications requiring rigidity, mechanical properties, and fracture characteristics, such as hoses, rubber belts, anti-vibration rubber, and various industrial products. It can also be used as a modifying agent for plastics.

Moreover, the rubber composition is also useful in applications requiring balance between hardness-related physical properties and processability, such as a rubber composition for shoe soles and a rubber composition for golf balls.

EXAMPLES

Examples based on the present invention will be specifically described below, however, they do not limit the purpose of the present invention. Measurement methods of each physical property are as follows.

<Evaluation of Polybutadiene Composition>

(1) Hexane Insoluble Fraction (HI)

The extracted residue obtained after 2 g of the polybutadiene composition was subjected to Soxhlet extraction in 200 ml of n-hexane for 4 hours was determined as a HI (wt %) of the polybutadiene composition.

(2) SPB Content ($F_{SPB}$)

From the vinyl structure proportion measured by a Fourier transform infrared spectrophotometer (FT-IR), an $F_{SPB}$ of the polybutadiene composition was calculated by using a preliminarily prepared calibration curve of the vinyl structure proportion vs. the content of SPB.

(3) Interfacial Thickness ($T_{IF}$)

1. Preparation of Test Piece (Crosslinked Product of Polybutadiene Composition) for Evaluation 100 parts of the polybutadiene composition were compounded with 1 part of zinc oxide, 2 parts of stearic acid, 1.5 parts of sulfur, and 1 part of N-tert-butyl-2-benzothiazolyl sulfenamide (product name: "NOCCELER NS", manufactured by OUCHI SHINKO CHEMICAL INDUSTRIAL CO., LTD.) as an accelerator, and the mixture was blended at 50° C. for 5 minutes using a two roll mill. The compounded product was press-vulcanized at 160° C. for 60 minutes to produce a 2 mm-thick sheet of crosslinked product. Next, the crosslinked product was subjected to Soxhlet treatment. Cyclohexane was used as a solvent, and the reflux was performed at 110° C. for 8 hours. It was vacuum dried at 60° C. for 2 hours after having been removed from a cylindrical filter paper. Then, the tip of the sample piece was cut at −140° C. using a cryomicrotome to fabricate a smooth surface for AFM observation.

2. Measurement Method

Atomic force microscope (AFM) that has a MultiMode8 and a NanoscopeV, manufactured by Bruker Japan Corporation, was used and measurement was carried out with a Peak Force QNM mode. An OMCL-TR800PSA (nominal spring constant of 0.57 N/m, manufactured by Olympus Corporation) was used as an AFM cantilever. Moreover, a measurement size was 3×3 m, and the number of measurement points was 256 points per a side, yielding a total number of points of 65536 for entire size. Assuming a Poisson ratio of 0.5, elastic modulus was calculated by analyzing all force curves to obtain an elastic modulus image. Elastic modulus images at four locations were acquired, and interfacial thicknesses ($T_{IF}$) at the IF portions in the total of 30 locations in those images were measured, and an average value thereof was used as a $T_{IF}$ for that sample. The thickness of the interfacial component was calculated by the method described above.

(4) Content of Interfacial Component ($F_{OR}$)

Using the measured values of the HI in (1) above and the $F_{SPB}$ in (2) above, an $F_{OR}$ was calculated from the following Expression 2.

$F_{OR}$ (% by mass)=Hexane insoluble fraction (HI)− Content of SPB ($F_{SPB}$)  (Expression 2)

(5) Number of SPBs ($n_{SPB}$)

Four elastic modulus images with 3 μm×3 μm (each at a different location) were obtained by using the same test piece for evaluation and the same measurement method as in the measurement of interface thickness. A location where the elastic modulus was 50 MPa or larger was blacked out as SPB, and a location where the elastic modulus was smaller than 50 MPa was whited out as a rubber component (polybutadiene rubber), they were converted to a black and white-binarized image, and domains with a size of 10 pixels squared or more were counted as SPB domains. The number of SPBs domains in the four images was summed up, which was defined as the number of SPBs ($n_{SPB}$).

(6) SPB Size Index ($\phi_{SPB}$)

$\phi_{SPB}$ was obtained by multiplying a reciprocal of the number of SPBs ($n_{SPB}$), $1/n_{SPB}$, by 1000.

(7) Mooney Viscosity ($ML_{1+4}(100°\ C.)$)

A test sample was preheated at 100° C. for 1 minute, and then the Mooney viscosity was measured for 4 minutes according to JIS K6300. The Mooney viscosity is an index denoting processability of polybutadiene composition.

<Evaluation of Processability>
A: Mooney viscosity of 65 or less
C: Mooney viscosity exceeding 65

(8) Swell

Using a capillary die with a capillary length of 8.0 mm, a capillary diameter of 1.0 mm$, and an entrance angle of 90°, the polybutadiene composition was preheated at 100° C. for 10 minutes in an extrusion processability measuring apparatus (Rosand RH10 twin capillary rheometer manufactured by NETZSCH), extruded at a shear rate of 10 sec$^{-1}$, and then allowed to stand undisturbed at room temperature for 1 hour to obtain a polybutadiene composition extrudate. A ratio between a cross-sectional area of the extrudate obtained and a cross-sectional area of the die opening was measured to calculate a swell. The swell is an index of extrusion dimensional stability of the polybutadiene composition.

<Evaluation of Extrusion Dimensional Stability>
A: Swell of 1.69 or less
C: Swell exceeding 1.69

(9) Hardness

Hardness; According to JIS K6253, hardness of the polybutadiene composition crosslinked product was measured at room temperature using a type-A durometer. It is noted that the polybutadiene composition crosslinked product is the same as the test piece (polybutadiene composition crosslinked product) for interfacial thickness evaluation.

<Evaluation of Hardness>
A: Hardness is 50 or more
C: Hardness is less than 50

(10) Physical Properties Balance Index

A numerical value obtained by dividing hardness by the Mooney viscosity and the swell was the physical properties balance index. It is an index of the physical properties balance of processability, extrusion dimensional stability, and hardness.

<Evaluation of Physical Properties Balance>
A: Physical properties balance index of 0.74 or more.
B: Physical properties balance index of 0.70 or more and less than 0.74
C: Physical properties balance index of less than 0.70

<Evaluation of Polybutadiene Rubber in Polybutadiene Composition>

(Synthesis of Polybutadiene Rubber)

After purging a stainless steel pressure vessel with nitrogen, cis-1,4 polymerization was performed. A temperature was set at 60° C. The molar concentrations of the raw materials charged were as follows: 5.78 mM of butadiene, 4.63 mM of cyclohexane, 2.22 mM of water, 0.25 mM of carbon disulfide ($CS_2$), 14.60 μM of dilauryl-3,3'-thiodipropionate (TPL), 33.40 mM of 1,5-cyclooctadiene (COD), 2.60 mM of diethylaluminum chloride (DEAC), 0.30 mM of triethylaluminum (TEA), and 4.89 μM of cobalt octylate ($Co(Oct)_2$).

Finally, the reaction was terminated and desolventizatized. After having added "Irganox" ® 1520L manufactured by BASF to a concentration of 0.90 mM, the polymerized product was taken out and vacuum dried at 100° C. to obtain polybutadiene rubber.

(Mooney Viscosity ($ML_{1+4}(100°\ C.)$))

A test sample was preheated for 1 minute at 100° C., and then the Mooney viscosity was measured for 4 minutes according to JIS K6300. The Mooney viscosity ($ML_{1+4}$ (100° C.)) was 24.3.

(Toluene Solution Viscosity (Tcp))

A viscosity of a 5% by weight toluene solution of the polybutadiene rubber (Tcp) was determined using a Canon-Fenske viscometer No. 400 at 25° C. after having dissolved 2.28 g of the polymer in 50 ml of toluene. A standard solution for viscometer calibration (JIS Z8809) was used as a standard solution. The toluene solution viscosity (Tcp) was 63.9 cps.

(Tcp/ML)

The measurement values of the above Mooney viscosity (ML) and the above toluene solution viscosity (Tcp) were used to obtain Tcp/ML. Tcp/ML was 2.63.

(Number-Average Molecular Weight (Mn), Weight-Average Molecular Weight (Mw), and Molecular Weight Distribution (Mw/Mn))

Gel permeation chromatography (GPC manufactured by Tosoh Corporation) was carried out at a temperature of 40° C. by using tetrahydrofuran as a solvent, and the number-average molecular weight (Mn), weight-average molecular weight (Mw), and molecular weight distribution (Mw/Mn)) of polybutadiene rubber were calculated by using a calibration curve determined from the obtained molecular weight distribution curve using polystyrenes as standard materials. The number-average molecular weight (Mn) was 192,000, the weight-average molecular weight (Mw) was 411,000, and the molecular weight distribution (Mw/Mn) was 2.15.

(Microstructure)

The microstructure of polybutadiene was determined by a Fourier transform infrared spectrophotometer (FT-IR). Specifically, the microstructure of polybutadiene rubber was determined from an absorption intensity ratio of the peak position (cis: 740 cm$^{-1}$) derived from the microstructure. The cis-configuration content was 98.3%.

<Production Example of Polybutadiene Composition>

Reference Example 1

After purging a stainless steel pressure vessel with nitrogen, cis-1,4 polymerization was performed. A temperature was set at 60° C. The molar concentrations of the raw materials charged were as follows: 5.78 M of 1,3-butadiene, 4.63 M of cyclohexane, 2.22 mM of water, 0.25 mM of carbon disulfide ($CS_2$), 14.60 M of dilauryl-3,3'-thiodipropionate (TPL), 33.40 mM of 1,5-cyclooctadiene (COD), 2.60 mM of diethylaluminum chloride (DEAC), 0.30 mM of triethylaluminum (TEA), and 4.89 μM of cobalt octylate ($Co(Oct)_2$).

Subsequently syndiotactic-1,2-polymerization was carried out. A temperature was set at 10° C. To the above components were added triethylaluminum (TEA) and cobalt octylate (Co(Oct)$_2$) so that the former concentration was 3.96 mM and the latter concentration was 38.19 µM.

Finally, the reaction was terminated and desolventization and dehydration and drying were performed. After having added "Irganox" ® 1520L manufactured by BASF and naphthoquinone to a concentration of 0.90 mM and 0.50 mM, respectively, the polymerization product was taken out and vacuum-dried at 100° C. to obtain a polybutadiene composition.

Example 2

After purging a stainless steel pressure vessel with nitrogen, cis-1,4 polymerization was performed. A temperature was set at 67° C. The molar concentrations of the raw materials charged were as follows: 4.57 M of 1,3-butadiene, 1.87 M of cyclohexane, 1.90 mM of water, 0.13 mM of carbon disulfide (CS$_2$), 7.87 µM of dilauryl-3,3'-thiodipropionate (TPL), 16.5 mM of 1,5-cyclooctadiene (COD), 3.20 mM of diethylaluminum chloride (DEAC), 0.36 mM of triethylaluminum (TEA), and 6.70 µM of cobalt octylate (Co(Oct)$_2$).

Subsequently syndiotactic-1,2-polymerization was carried out. A temperature was set at 60° C. To the above components were added 1,3-butadiene, water, triethylaluminum (TEA), and cobalt octylate (Co(Oct)$_2$) so that concentrations thereof were 5.05 M, 3.11 mM, 4.66 mM, and 33.6 µM, respectively.

Finally, the reaction was terminated and desolventization and dehydration and drying were performed. "Irganox" ® 1520L manufactured by BASF was added to a concentration of 10.5 µM and then water was added to a concentration of 0.82 M. Desolventization by hot water treatment was further carried out, and then dehydration and drying were carried out using a screw compression squeezer and an expansion-type extrusion dryer in combination to obtain a polybutadiene composition.

Example 3

After purging a stainless steel pressure vessel with nitrogen, cis-1,4 polymerization was performed. A temperature was set at 70° C. The molar concentrations of the raw materials charged were as follows: 4.56 M of 1,3-butadiene, 1.75 M of cyclohexane, 1.87 mM of water, 0.22 mM of carbon disulfide (CS$_2$), 7.88 µM of dilauryl-3,3'-thiodipropionate (TPL), 14.2 mM of 1,5-cyclooctadiene (COD), 3.20 mM of diethylaluminum chloride (DEAC), 0.37 mM of triethylaluminum (TEA), and 7.30 µM of cobalt octylate (Co(Oct)$_2$).

Subsequently syndiotactic-1,2-polymerization was carried out. A temperature was set at 62° C. To the above components were added 1,3-butadiene, water, triethylaluminum (TEA), and cobalt octylate (Co(Oct)$_2$) so that concentrations thereof were 5.29 M, 3.09 mM, 4.71 mM, and 30.2 µM, respectively.

Finally, the reaction was terminated and desolventization and dehydration and drying were performed. "Irganox" ® 1520L manufactured by BASF was added to 95.9 µM and then water was added to 0.82 M. Desolventization by hot water treatment was further carried out, and then dehydration and drying were carried out using a screw compression squeezer and an expansion-type extrusion dryer in combination to obtain a polybutadiene composition.

Example 4

After purging a stainless steel pressure vessel with nitrogen, cis-1,4 polymerization was performed. A temperature was set at 60° C. The molar concentrations of the raw materials charged were as follows: 5.18 M of 1,3-butadiene, 2.16 M of cyclohexane, 1.89 mM of water, 0.25 mM of carbon disulfide (CS$_2$), 7.85 µM of dilauryl-3,3'-thiodipropionate (TPL), 14.37 mM of 1,5-cyclooctadiene (COD), 3.20 mM of diethylaluminum chloride (DEAC), 0.36 mM of triethylaluminum (TEA), and 7.30 µM of cobalt octylate (Co(Oct)$_2$).

Subsequently syndiotactic-1,2-polymerization was carried out. A temperature was set at 63° C. To the above components were added 1,3-butadiene, water, triethylaluminum (TEA), and cobalt octylate (Co(Oct)$_2$) so that concentrations thereof were 5.18 M, 3.25 mM, 5.23 mM, and 30.6 µM, respectively.

Finally, the reaction was terminated and desolventization and dehydration and drying were performed. "Irganox" ® 1520L manufactured by BASF was added to 82.9 µM and then water was added to 0.82 M. Desolventization by hot water treatment was further carried out, and then dehydration and drying were carried out using a screw compression squeezer and an expansion-type extrusion dryer in combination to obtain a polybutadiene composition.

Example 5

After purging a stainless steel pressure vessel with nitrogen, cis-1,4 polymerization was performed. A temperature was set at 65° C. The molar concentrations of the raw materials charged were as follows: 4.60 M of 1,3-butadiene, 1.72 M of cyclohexane, 1.69 mM of water, 0.16 mM of carbon disulfide (CS$_2$), 8.3 µM of dilauryl-3,3'-thiodipropionate (TPL), 15.0 mM of 1,5-cyclooctadiene (COD), 3.14 mM of diethylaluminum chloride (DEAC), 0.36 mM of triethylaluminum (TEA), and 6.7 µM of cobalt octylate (Co(Oct)$_2$).

Subsequently syndiotactic-1,2-polymerization was carried out. A temperature was set at 61° C. To the above components were added 1,3-butadiene, water, triethylaluminum (TEA), and cobalt octylate (Co(Oct)$_2$) so that concentrations thereof were 5.42 M, 2.89 mM, 4.65 mM, and 25.7 µM, respectively.

Finally, the reaction was terminated and desolventization and dehydration and drying were performed. "Irganox" ® 1520L manufactured by BASF was added to 89.1 µM and then water was added to 0.81 M. Desolventization by hot water treatment was further carried out, and then dehydration and drying were carried out using a screw compression squeezer and an expansion-type extrusion dryer in combination to obtain a polybutadiene composition.

Comparative Example 1

A polybutadiene composition was obtained in the same manner as in Example 1 except that the concentration of water in cis-1,4-polymerization, triethylaluminum (TEA) in syndiotactic-1,2-polymerization, cobalt octylate (Co(Oct)$_2$) and a polymerization temperature were changed to 1.98 mM, 3.43 mM, 127.09 µM, and 80° C., respectively.

Comparative Example 2

A polybutadiene composition was obtained in the same manner as in Example 1 except that the concentration of water in cis-1,4-polymerization, cobalt octylate (Co(Oct)$_2$) in syndiotactic-1,2-polymerization, and a polymerization temperature were changed to 2.10 mM, 28.89 mM, and 0° C., respectively.

Comparative Example 3

A polybutadiene composition was obtained according to the method described in Production Example 3 of Patent Document 4.

Comparative Example 4

A polybutadiene composition was obtained according to the method described in Production Example 1 of Patent Document 5.

Comparative Example 5

A polybutadiene composition was obtained according to the method described in Example 7 of Patent Document 6.

treatment as well as desolventization, and dehydration and drying by using a screw compression squeezer and an expansion-type extrusion dryer was carried out, had a thickness of the interfacial component in the range of 40 to 55 nm, and is extremely excellent in the physical properties balance.

INDUSTRIAL APPLICABILITY

The polybutadiene composition of the present invention is useful as a material for various rubber applications including tires and rubber belts because of its excellent extrusion dimensional stability and processability, high hardness of the rubber composition, and excellent physical properties balance.

TABLE 1

| | HI (% by mass) | $F_{SPB}$ (% by mass) | $T_{IF}$ (nm) | $F_{OR}$ (% by mass) | $n_{SPB}$ | $\Phi_{SPB}$ | $F_{OR}/\Phi_{SPB}$ | $F_{OR}/F_{SPB}$ |
|---|---|---|---|---|---|---|---|---|
| Reference Example 1 | 16.5 | 11.7 | 66.5 | 4.80 | 107 | 9.35 | 0.514 | 0.411 |
| Example 2 | 13.6 | 11.7 | 47.1 | 1.91 | 299 | 3.34 | 0.572 | 0.164 |
| Example 3 | 12.4 | 11.4 | 44.9 | 1.03 | 273 | 3.66 | 0.282 | 0.090 |
| Example 4 | 18.2 | 17.9 | 44.7 | 0.30 | 390 | 2.56 | 0.117 | 0.017 |
| Example 5 | 18.0 | 16.1 | 49.1 | 1.87 | 306 | 3.27 | 0.571 | 0.116 |
| Comparative Example 1 | 11.9 | 11.9 | 39.5 | 0.01 or less | 65 | 15.38 | 0.001 or less | 0.001 or less |
| Comparative Example 2 | 14.6 | 10.6 | 72.2 | 4.02 | 185 | 5.41 | 0.744 | 0.380 |
| Comparative Example 3 | 11.6 | 8.1 | 61.3 | 3.45 | 185 | 5.41 | 0.638 | 0.423 |
| Comparative Example 4 | 26.9 | 11.4 | 35.8 | 15.50 | 129 | 7.75 | 2.000 | 1.360 |
| Comparative Example 5 | 13.1 | 10.7 | 57.5 | 2.40 | 283 | 3.54 | 0.678 | 0.224 |

| | ML (Processability) | | Swell (Extrusion dimensional stability) | | Hardness | | Physical properties balance index | |
|---|---|---|---|---|---|---|---|---|
| | Measurements | Evaluation | Measurements | Evaluation | Measurements | Evaluation | Calculated value | Evaluation |
| Reference Example 1 | 62.6 | A | 1.29 | A | 57.5 | A | 0.71 | B |
| Example 2 | 41.2 | A | 1.63 | A | 56.9 | A | 0.85 | A |
| Example 3 | 44.3 | A | 1.68 | A | 54.8 | A | 0.74 | A |
| Example 4 | 61.2 | A | 1.30 | A | 62.1 | A | 0.78 | A |
| Example 5 | 60.2 | A | 1.30 | A | 65.0 | A | 0.83 | A |
| Comparative Example 1 | 39.3 | A | 1.70 | C | 41.1 | C | 0.62 | C |
| Comparative Example 2 | 67.0 | C | 1.23 | A | 59.7 | A | 0.73 | B |
| Comparative Example 3 | 45.3 | A | 1.75 | C | 55.9 | A | 0.71 | B |
| Comparative Example 4 | 50.3 | A | 1.95 | C | 48.0 | A | 0.49 | C |
| Comparative Example 5 | 81.9 | C | 1.67 | A | 52.2 | A | 0.38 | C |

The polybutadiene composition of Comparative Example 1 has low extrusion dimensional stability and insufficient hardness of the rubber composition. Moreover, the polybutadiene composition of Comparative Example 2 has low processability. Further, the polybutadiene compositions of Comparative Examples 3 and 4 have low extrusion dimensional stability. Furthermore, the polybutadiene composition of Comparative Example 5 has low processability. Each of the polybutadiene compositions of Comparative Examples 1 to 5 in which neither hot water treatment, nor dehydration and drying treatment of applying heat, shear and squeezing force was carried out, and the thickness of the interfacial component (40 to 55 nm) was not satisfied, has the low physical properties balance index.

The polybutadiene composition of Reference Example 1 is excellent in processability and extrusion dimensional stability, as well as hardness of the rubber composition, however, it has a low value of the physical properties balance index. On the other hand, each of the polybutadiene compositions of Examples 2 to 5, in which the hot water

The invention claimed is:

1. A polybutadiene composition comprising polybutadiene rubber and syndiotactic-1,2-polybutadiene, wherein
   the polybutadiene composition has an interfacial component between the polybutadiene rubber and the syndiotactic-1,2-polybutadiene, and
   the interfacial component has a thickness of 40 to 55 nm as measured by an atomic force microscope,
   wherein a ratio of a mass percent of the interfacial component to a mass percent of the syndiotactic-1,2-polybutadiene is 0.01 to 0.20.

2. The polybutadiene composition according to claim 1, wherein the interfacial component has a content of 0.1 to 2.0% by mass.

3. The polybutadiene composition according to claim 1, wherein a SPB size index is 1 to 5, and is obtained by multiplying a reciprocal of the number of syndiotactic-1,2-polybutadiene domains per unit area, wherein the unit area is 36 μm$^2$, measured with an atomic force microscope by 1,000.

4. The polybutadiene composition according to claim 1, wherein a numerical value obtained by dividing a mass percent of the interfacial component by the SPB size index is 0.1 to 0.6.

5. A rubber composition comprising the polybutadiene composition according to claim 1.

6. A tire comprising the rubber composition according to claim 5.

7. A rubber belt comprising the rubber composition according to claim 5.

8. The polybutadiene composition according to claim 1, wherein the melting point of the syndiotactic-1,2-polybutadiene is 150 to 220° C.

9. The polybutadiene composition according to claim 1, wherein the melting point of the syndiotactic-1,2-polybutadiene is 180 to 210° C.

* * * * *